G. W. HOLTSCLAW AND H. LARSON.
SEED CORN STRINGER.
APPLICATION FILED OCT. 14, 1919.
1,360,239.
Patented Nov. 23, 1920.
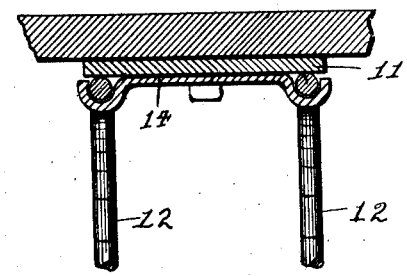
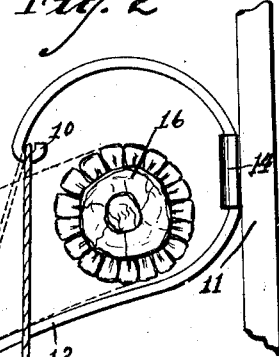
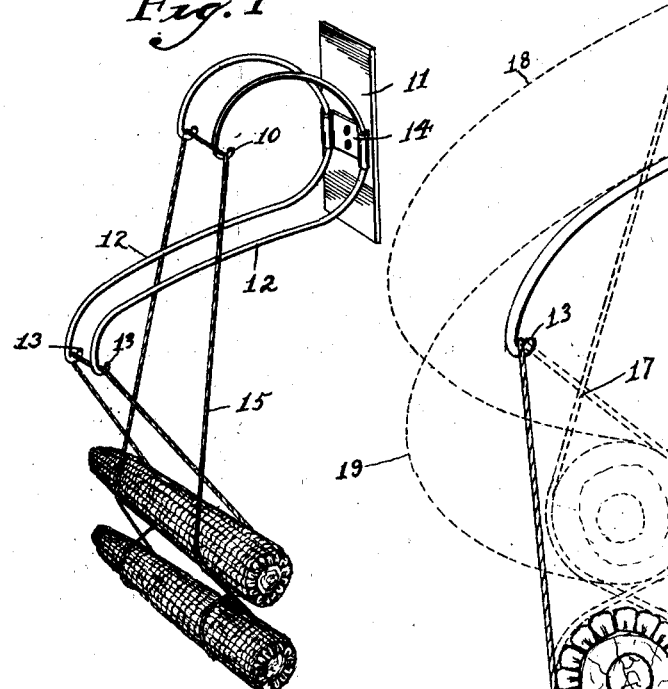

UNITED STATES PATENT OFFICE.

GEORGE W. HOLTSCLAW AND HARRY LARSON, OF GOWRIE, IOWA.

SEED-CORN STRINGER.

1,360,239.   Specification of Letters Patent.   Patented Nov. 23, 1920.

Application filed October 14, 1919. Serial No. 330,660.

*To all whom it may concern:*

Be it known that we, GEORGE W. HOLTSCLAW and HARRY LARSON, citizens of the United States, and residents of Gowrie, in the county of Webster and State of Iowa, have invented a certain new and useful Seed-Corn Stringer, of which the following is a specification.

The object of our invention is to provide a seed corn stringer of simple, durable and inexpensive construction, of the class in which a string loop is provided, and which is supported on two elevated supports, thus forming two depending loops in which the ears of seed corn are inserted, and before the insertion of each successive ear the string loop is crossed so that the ears are firmly supported and also held spaced apart.

More specifically in this connection, it is our object to provide a stringer of this class in which, after the string loop is placed in position for use, the operator need not touch or move any part of the stringing device, and the process of stringing a series of ears of corn may be easily, quickly and conveniently carried out by the operator when he holds a quantity of ears of corn in one hand and simply places them one by one, in the stringer, and the operation of crossing the strings is automatically completed without any special operation on the part of the operator.

Our invention consists in the construction, arrangement and combination of the various parts of the device, whereby the objects contemplated are attained, as hereinafter more fully set forth, pointed out in our claim, and illustrated in the accompanying drawings, in which:

Figure 1 shows a perspective view of a seed corn stringer embodying our invention, showing two ears of corn supported therein.

Fig. 2 shows an enlarged, detail, side elevation of same. The dotted lines in said figure show the path of travel of an ear of corn, and the position that the string loop would assume after said ear had been pushed downwardly over the guide into the loop; and Fig. 3 shows a detail sectional view illustrating the means of fastening the string loop support and corn guide in position.

Referring to the accompanying drawings, it will be seen that our improved stringer comprises two parallel members, each of which is made of a single piece of wire. On each of these members there is, at the upper end, a hook 10, and from this hook the wire curves upwardly and inwardly to the supporting plate 11, and then from the supporting plate this wire is formed into a track or guide 12, which extends downwardly and forwardly to a point spaced outwardly beyond a vertical line through the hook 10 and terminates at its lower end in an inwardly extending hook 13. These two wires are held firmly in position and spaced apart from each other by a fastening plate 14, or other suitable means for connecting it to the supporting lever. The numeral 15 indicates a string for supporting the ears of corn, which string has its ends connected to form a continuous loop.

In practical operation the string 15 is placed in position over the hooks 13 and also over the hooks 10, thus forming a double loop-shaped arrangement of the string, with its upwardly inclined portions extending straight downwardly from the respective hooks 10 and 13. The first ear of corn is placed between these loops and without disturbing the aforementioned arrangement of the loops. Then the second ear is placed above the inner end of the track or guide 12, as shown at 16 in Fig. 2. Then this ear is pushed downwardly along the inclined track or guide 12, until it passes beyond the lower end thereof, and when in this position it will be outside of the part of the string that is attached to the hooks 13, so that as it is further pushed downwardly into position within the string, the string will be crossed, as shown by the dotted lines at 17 in Fig. 2. Then the next ear of corn is inserted between the string loops below the inclined track or guide 12, and this method is carried on until the string has been properly filled with ears of corn. The dotted lines 18 and 19 show the path of travel of the ear of corn as it is rolled down the inclined track or guide 12.

We are aware that heretofore devices have been provided for stringing corn, which devices have been so arranged that when the operation is completed ears of corn will be supported in the string in the same manner as is done with our device. We, however, are not aware that in a device of this kind there has ever been employed an inclined track or guide so arranged that an ear of corn placed thereon will, when being moved downwardly to position within the loop, automatically cross the strings and thus dispense with a hand operation of crossing the string, which has been necessary with other prior devices.

We claim as our invention:

In a seed corn stringer, the combination of two string supporting hooks spaced from each other, means for supporting them in position spaced from each other, a support, two tracks or guides extending from a point adjacent to the support and below said hooks, in a direction downwardly and away from the support to a point spaced outwardly from the support farther than the said hooks and below them, and two spaced hooks at the lower ends of said inclined tracks or guides, also designed to receive a string, for the purposes stated.

GEO. W. HOLTSCLAW.
HARRY LARSON.